May 25, 1937.  A. V. DE FOREST  2,081,579
RECORDING INSTRUMENT
Filed Dec. 8, 1931  2 Sheets-Sheet 1
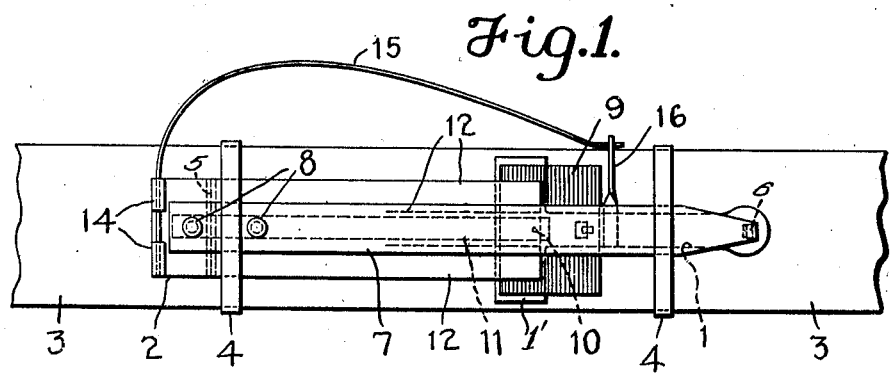
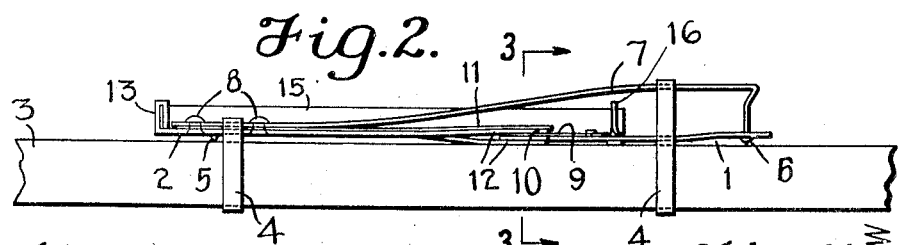
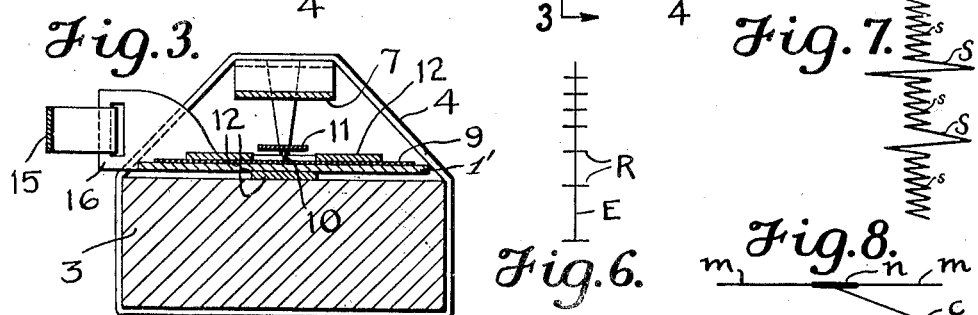
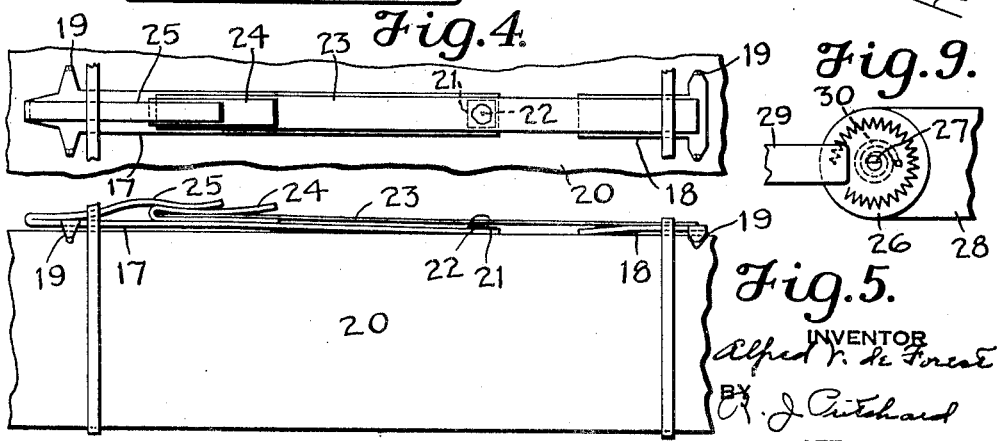

May 25, 1937.  A. V. DE FOREST  2,081,579
RECORDING INSTRUMENT
Filed Dec. 8, 1931  2 Sheets-Sheet 2
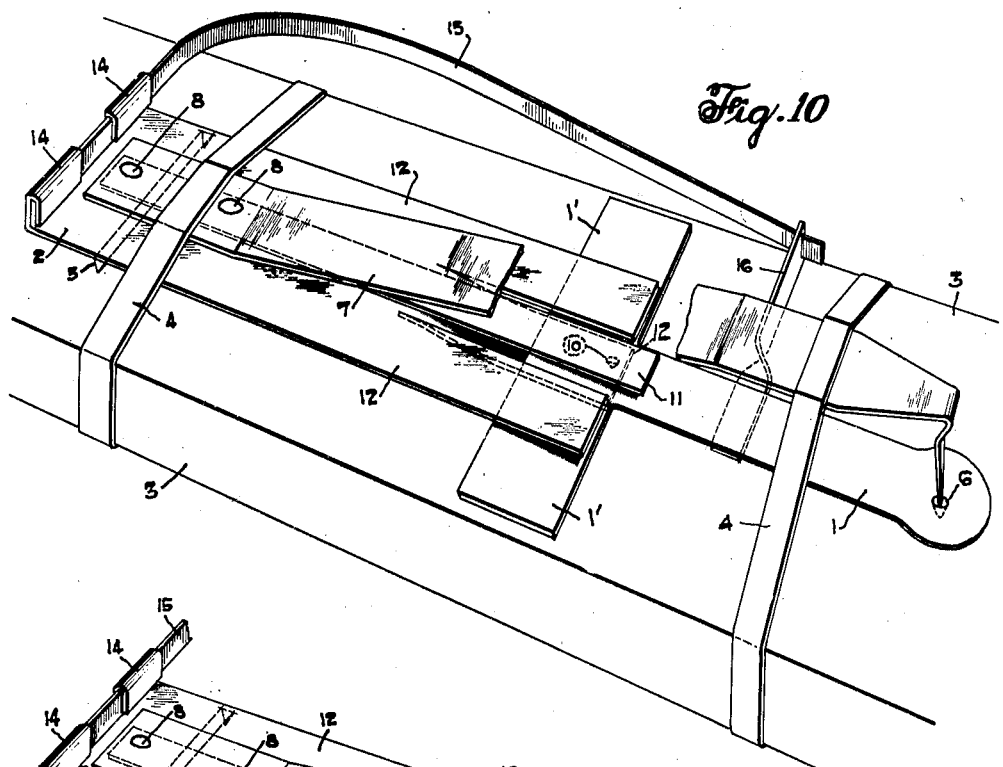
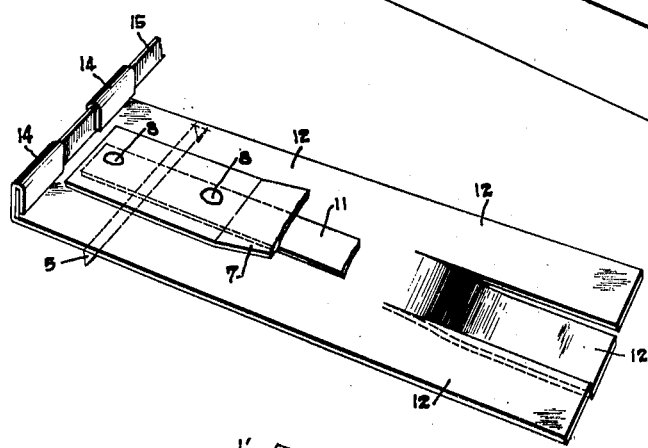
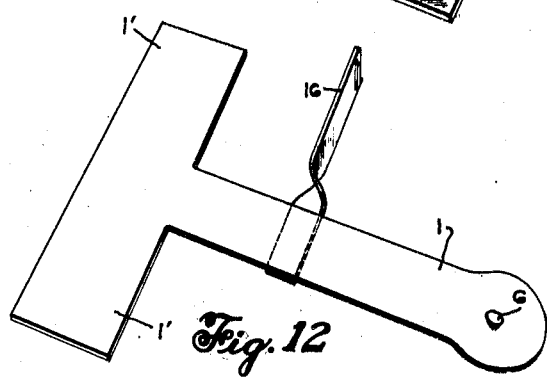
INVENTOR
A.V. De Forest
BY
ATTORNEY Patented May 25, 1937

2,081,579

UNITED STATES PATENT OFFICE 2,081,579

RECORDING INSTRUMENT

Alfred V. de Forest, Bridgeport, Conn., assignor to Baldwin-Southwark Corporation, a corporation of Delaware Application December 8, 1931, Serial No. 579,691

7 Claims. (Cl. 234—1)

My invention relates to improvements in recording instruments and, more particularly, to improvements in instruments for recording the extent of movements between, or the deformations occurring in, bodies.

One of the objects of the invention is the provision of a simple form of recording instrument comprising a pair of relatively movable members for recording the extent, the extent and number, or the extent and direction of movements occurring in or between bodies.

Another object is to provide a recording instrument which may be attached to rapidly moving parts of structures or machines, without appreciably changing the distribution of stress in such parts, and which can be used in small spaces and on parts of irregular shapes, such as pipe fittings.

Further objects are to provide an instrument so constructed that the record readings are not influenced by contraction or expansion differentials between the parts of the instrument and the work; which can be used at temperatures up to the softening point of available metals; and which is adapted to operate while immersed in liquids whose corrosive attacks may be resisted by available metals or alloys.

Other objects and advantages will appear as the description proceeds.

In the drawings:

Fig. 1 is a top plan view on one form of the invention showing the instrument applied to a body.

Fig. 2 is a side elevation of the structure shown in Figure 1.

Fig. 3 is a cross-sectional view taken on the line 3—3 of Figure 2.

Fig. 4 is a top plan view of another embodiment.

Fig. 5 is a side elevation of the form shown in Figure 4.

Figs. 6, 7 and 8 illustrate various forms of records obtainable, and

Fig. 9 is a detail view of a form of rotatable record dial.

Fig. 10 is a perspective of the Fig. 1 form of instrument applied to a specimen, one part being broken away for clarity;

Fig. 11 is a perspective of one element, with associated parts broken away;

Fig. 12 is a perspective of another element which cooperates with the element of Fig. 11.

In the form shown in Figures 1 to 3, the device comprises a pair of members 1 and 2, shown applied to a body or specimen 3, by rubber bands 4, and used here as an extensometer for recording the extent of deformations occurring in a body. Members 1 and 2, are adapted to be moved relatively to each other but only when the body is deformed under the influence of stress, or other cause.

The under face of each member, at its distal end, is provided with means for connecting it to the body, these means comprising a knife-edge 5, carried by member 2, and a pivot point 6, projecting from member 1. These means fix each member in place on body 3, and the pivotal connection 6, permits transverse relative movement between the members. In this form, a spring 7 is fixed at one end to member 2, by rivets 8, while its free end is turned downwardly and rests in a recess provided in number 1, and presses the pivot 6, against the body 3.

The end of member 1 adjacent to member 2, is extended laterally as at 1' and carries a record surface 9, which is engaged by a marker 10 mounted in a tongue 11 on the member 2. This tongue is interposed between spring 7 and member 2 all of which are secured together by rivets 8. Tongue 11 acts to hold the marker in engagement with the record surface and also serves as an energy-absorbing or damping member to prevent vibratory movement of the marker.

Member 2, is slit longitudinally from the end adjacent member 1 to a point about midway of the member to provide three flexible fingers 12, and the laterally extended end 1' of member 1 carrying the record surface, is received between the lower faces of the exterior fingers and the upper face of the central finger. A frictional interengagement between the members is thus provided, the function of which will appear.

The distal end of member 2, has a vertical wall 13, formed to provide ears 14, which receive one end of a spring 15. Attached to the other end of this spring is a link 16, which, in turn, is connected to the member 1.

By this construction the record surface may be moved transversely as well as longitudinally of the marker and a record of motion at right angles to the strain is produced for measurement.

In prior art devices, a certain transverse motion of a record element is obtained but such motion is continuous and is made proportional to time or to the speed of some power driven motor. The resulting record from such prior art devices requires a very long time axis if the motion is sufficient for analysis of rapidly fluctuating strains. The weight, cost and delicacy of the driving mechanism is also a disadvantage. In the device here described the relative movement between the members is continuous only while motion external to the instrument is being transmitted thereto. Such external motion may be the relative movement between two bodies or may be due to deformations occurring in a body resulting from stress or other cause. Accordingly, the time axis of the record is replaced by a motion proportional to the motion of the strain to be measured. In this way the larger the strain the more open becomes the record, while with small strains the records becomes as constricted as may be desired. The ratio of the respective motions may easily be altered and, if desired, the drive can be arranged so that strains below a certain figure may be repeated without any component motion as will be explained presently in connection with the use of rubber at the point of solid friction.

The spring 15, it will be observed, exerts a continuous torque at right angles to the direction of strain which extends between the knife edge 5 and pivot 6. Solid or static friction between the adjacent ends of the members 12 and 1' prevents this torque from moving member 1 about its pivot 6 until longitudinal motion or strain is introduced in the body or specimen 3 whereupon pivot pin 6 and knife edge 5 are moved relative to each other with consequent longitudinal movement between members 1 and 2. This movement between the ends 1' and 12 of said members reduces the static friction therebetween to dynamic or running friction. The static friction is normally sufficient to completely resist the torque of spring 15 but the running friction is not sufficient to do this, the result being that upon occurrence of running friction the spring moves member 1 laterally against such running friction. However, as soon as longitudinal movement or strain in the specimen ceases, then the static friction is instantaneously restored between the ends 12 and 1', thus preventing spring 15 from moving member 1 laterally about its pivot 6. Hence it is seen that when the specimen or body is subjected to alternate compression and tension stresses, the knife edge 5 and pivot 6 will be moved alternately toward and away from each other and this in turn alternately transforms the above friction from static to running friction or vice versa so as to control the successive feeding movement. The record surface 9 on member 1 will thereby feed laterally only during movement between the knife edge and pivot, the extent of this movement being very minute. The sideways motion is closely proportional to the longitudinal motion. In the ordinary case then, small strains can be adjusted to give small scale torque movement. In most cases this is desirable in order to conserve space on the record. A further adjustment may be made, by which strains below a certain limit produce no side motion. This can be accomplished by placing rubber similar to 24 of Fig. 4 or the equivalent spring at the point of solid friction, which point is between the tongues 12 and lateral portion 1' of member 1. As long as the rubber is deformed elastically there will be no resulting side or component motion. When the motion is great enough to slide the rubber, the transverse component force, due to the spring 15, will take effect.

The type of record produced by this construction is illustrated, in Figure 7, in a very much magnified manner over the actual record which is so small as to require microscopic examination. Figure 7 illustrates, by way of example, how a specimen is subjected to a series of alternate stresses s of uniform amplitude with occasional momentary stresses S of relatively large amplitude.

In cases where only the maximum range of strain is desired a simple record in one dimension is sufficient. Under these conditions the point 10 scratches a single line on the record surface 9 and under repeated load on the specimen 3 the depth and width of such line increases and a distinction may be made between a small range of motion repeated many times, and a larger motion repeated only a small number of times. This form of instrument is also desirable for compound stresses such as tension and shear, where the direction of the scratch may be a matter of much importance in resolving the stresses. The tension component extends longitudinally of the specimen and the shear component transversely thereof.

This function of obtaining tension and shear components also can be performed by a device similar to that shown in Figures 4 and 5.

In this form, a pair of relatively movable members 17 and 18 are provided. The lower face of each member, at its distal end, carries a knife-edge 19 engaging the body or specimen 20. The other end of member 17 carries a record surface 21, engaged by marker 22, mounted in and at an intermediate point of a finger 23 which is fixed to and extends forwardly from the member 18. The free end of the finger is embraced by a rubber member 24. This member and the end of the finger are received and clamped between the upper face of member 17 and an inwardly extending tongue 25. The marker is then held in engaging relation with respect to the record surface and the rubber 24 serves to prevent vibratory movement of the marker. The motion of finger 23, relative to member 17 is within the elastic deformation of the rubber 24 so that the rubber will therefore permit such relative movement.

In this form as well, it will be observed, continuous relative movement between the members occurs only while external motion is being transmitted to the members.

The type of record inscribed by this form is shown in Figure 8. The range of repeated loads constituting tension or compression on the specimen is represented by the widened portion n, while the portion m designates maximum loads. In this view also the line c shows the record made when the body is under the influence of a compound stress, such as torsion.

It may be desired to record a deformation in one direction and to provide means for intermittently inscribing a transverse record. That is, it may be desired to record the elongation of a body under increments of load, or to measure creep under a load in definite periods of time. This form of record is shown in Figure 6, in which the line E represents the elongation record and the lines R, at right angles thereto, designate time or load increments. This record may be produced by a device similar to that shown in Figures 4 and 5 and the reference lines R may be inscribed at selected time intervals or load increments by effecting a transverse relative movement between the members by any known electrical, or mechanical means, or such movement may be effected by manual operation.

In the uses of the device it will be noted that the relative movement between the members is continuous only when an external motion is being transmitted to the device.

In accordance with the invention, the area of available record surface may be increased without detracting from the compact arrangement of the parts, by providing a record disc adapted to rotate about a vertical axis. This disc 26, see Figure 9, may be pivoted on a stud 27 carried at one end of member 28, and is engaged by a marker on a spring finger 29, carried by the other member of the instrument, the marker being similar to markers 10 or 22 of the other forms. Suitable friction means may be employed to restrain the dial from turning until relative longitudinal movement between the members is taking place. During such movement, the disc is turned by a coil spring 30 attached to disc 26 and to the member 28.

The record surface is preferably hard and smooth and is formed of glass or polished steel and the marker is of the scratch type and is usually a diamond or other hard substance. A desirable arrangement is to provide the record member with a colored surface as indicated in Figure 1. A clear and easily distinguishable record is thus provided by virtue of the contrasting surfaces of the record member.

The record is produced without mechanical magnification and the motion recorded is magnified for measurement by an ordinary microscope, preferably of the metallurgical type. The hard point acting on a surface of glass or steel produces a fine, clear scratch record, which may be measured by the ordinary eyepiece micrometer. As the record may be traced or photographed and measured, measurements at 1,000 magnification are easily made, under which conditions motion of .00001 of an inch can readily be detected and .0001 of an inch accurately measured. Greater motion, of course, may be measured at lower power of the microscope.

Mechanical multiplication and clockwork mechanism are avoided and this permits several advantages to be secured. A simple, compact and inexpensive device may be provided. The instrument may be constructed from material having the same temperature coefficient as the body with which it is to be used, so that the readings will not be affected by temperature differentials. The device may be used for accurate recording at temperatures up to the softening point of available metals, at least up to 1200° F. in which case the device is suitably held in position on the specimens by screws passing through members 17 and 18 or other suitable means in place of rubber bands. Also, it may be made of any material which will resist corrosive attacks of liquids within which it may be immersed.

The light and compact construction, and the low cost of the instrument permit several of the devices to be simultaneously employed on a number of moving parts of a structure or machine, for example, a number of the devices may be attached to an aeroplane to be tested.

While the device has been illustrated as used to record the deformations of a body, it will be understood that it may be readily applied to other purposes. It may be used to record the movement between bodies or it can be inserted in a calibrated body and serve as a recording dynamometer. It is to be also understood that various structural changes may be made in carrying the invention into effect, without departing from the principle thereof.

What I claim is:

1. A recording instrument comprising a pair of members adapted for relative longitudinal movement when motion external to the instrument is transmitted thereto, and force producing means carried by one member and connected with the other for effecting relative transverse movements under control of said external motion, one member having a record surface and the other a marker engaging said surface.

2. A recording instrument comprising a pair of members adapted for relative longitudinal reciprocating movement when reciprocating motion external to the instrument is transmitted thereto, one member having a record surface and the other a marker engaging said surface, and a force producing spring connected with the record surface member and adapted to effect transverse relative movement in only one direction under control of successive reciprocations of said external motion.

3. A recording instrument comprising a pair of frictionally interengaged members, one member being adapted to be moved relatively to the other with a reciprocating movement when external reciprocating motion is transmitted to the instrument, one of said members having a record surface and the other a marker adapted to engage and inscribe a record on said surface, and means cooperating with said frictionally interengaged members for effecting relative movement therebetween in a continuous direction transverse to and during said reciprocating movement.

4. A recording instrument comprising a pair of members, one adapted to be moved longitudinally relatively to the other, one member having a record disc and the other a marker adapted to inscribe a record on said disc, said disc being rotatable and means for rotating the disc proportionally to longitudinal movement between said members.

5. A recording instrument comprising a pair of members, one adapted to be moved longitudinally relatively to the other when motion external to the instrument is transmitted thereto, one member having a record disc rotatable about a vertical axis, and the other member carrying a marker adapted to inscribe a record on the disc, a spring having one end connected to the disc for rotatably biasing the same, and means whereby said spring effects said rotation when said external motion is transmitted to the instrument.

6. A recording instrument comprising, in combination, a marker and a record receiving surface, means for effecting relative movement therebetween in response to an external movement to be measured, means producing a force for effecting relative feeding movement in another direction between said marker and record receiving surface, and means whereby when no external movement occurs said feeding movement is prevented by static friction but when external movement does occur said static friction is then transformed into moving friction thereby to allow said feeding movement.

7. A recording instrument comprising a marker and record receiving surface, means for effecting relative movement therebetween in response to external movements to be measured, means producing a force for effecting relative feeding movement in another direction between said record receiving surface and marker, and means whereby when no external movement occurs said feeding movement is prevented by static friction but when external movement does occur such static friction is transformed into moving friction thereby to allow said feeding movement, said latter means having component parts respectively connected to said marker and record receiving surface so as to be directly responsive to said external movements.

ALFRED V. DE FOREST.